US012583233B2

(12) United States Patent
Watanabe

(10) Patent No.: US 12,583,233 B2
(45) Date of Patent: Mar. 24, 2026

(54) IMAGE FORMING APPARATUS

(71) Applicant: KYOCERA Document Solutions Inc., Osaka (JP)

(72) Inventor: Takeshi Watanabe, Osaka (JP)

(73) Assignee: Kyocera Document Solutions, Inc. (JP)

( * ) Notice: Subject to any disclaimer, the term of this patent is extended or adjusted under 35 U.S.C. 154(b) by 141 days.

(21) Appl. No.: 18/694,955

(22) PCT Filed: Sep. 27, 2022

(86) PCT No.: PCT/JP2022/035947
§ 371 (c)(1),
(2) Date: Mar. 22, 2024

(87) PCT Pub. No.: WO2023/054360
PCT Pub. Date: Apr. 6, 2023

(65) Prior Publication Data
US 2025/0001767 A1 Jan. 2, 2025

(30) Foreign Application Priority Data
Sep. 28, 2021 (JP) ................................. 2021-157553

(51) Int. Cl.
*B41J 2/21* (2006.01)
*B41J 2/01* (2006.01)
*H04N 1/60* (2006.01)

(52) U.S. Cl.
CPC .............. *B41J 2/2139* (2013.01); *B41J 2/01* (2013.01); *B41J 2/2142* (2013.01); *H04N 1/6044* (2013.01); *B41J 2/2146* (2013.01)

(58) Field of Classification Search
CPC . B41J 2/2139; B41J 2/01; B41J 2/2142; B41J 2/2146; H04N 1/6044
See application file for complete search history.

(56) References Cited

U.S. PATENT DOCUMENTS

2006/0092211 A1 5/2006 Arakawa et al.
2019/0283447 A1* 9/2019 Yokozawa ............ G06T 7/0004

FOREIGN PATENT DOCUMENTS

JP 2006-142807 6/2006
JP 2013169760 A * 9/2013 ............ B41J 2/2139

* cited by examiner

*Primary Examiner* — Yaovi M Ameh

(57) ABSTRACT

A control unit 81 determines nozzles corresponding to an image to be printed, correspondingly to a position of a print sheet, and causes a recording head to eject ink from its nozzles. A correction processing unit 83 performs a correction process corresponding to each of plural ink ejection malfunction positions in the aforementioned image. Further, the correction processing unit 83 prints a test pattern using the recording head 1a, 1b, 1c or 1d, determines the ink ejection malfunction positions and ink ejection malfunction types on the basis of a scanned image of the test pattern, and performs the correction process such that the ink ejection malfunction of which the ink ejection malfunction type is non ejection is preferentially performed than the ink ejection malfunction of which the ink ejection malfunction type is ink ejection deviation.

6 Claims, 6 Drawing Sheets

PRIMARY SCANNING DIRECTION

VERTICAL LINE
TEST PATTERN

INK EJECTION
MALFUNCTION POSITION
(NON-EJECTION)

DENSITY
MEASUREMENT VALUE

PRIMARY-SCANNING-DIRECTIONAL
POSITION

FIG. 6

| INK EJECTION MALFUNCTION TYPE | INK EJECTION DEVIATION | NON EJECTION |
|---|---|---|
| FIRST (HORIZONTAL BAND) TEST PATTERN | WITHOUT DENSITY | WITHOUT DENSITY |
| SECOND (VERTICAL LINE) TEST PATTERN | WITH DENSITY | WITHOUT DENSITY |
| CORRECTION PROCESS (NUMBER OF INK EJECTION MALFUNCTION ≤ UPPERLIMIT VALUE) | PERFORMED | PERFORMED |
| CORRECTION PROCESS (NUMBER OF INK EJECTION MALFUNCTION > UPPERLIMIT VALUE) | NOT PERFORMED | PERFORMED |

IMAGE FORMING APPARATUS

TECHNICAL FIELD

The present invention relates to an image forming appa- ⁵ ratus.

BACKGROUND ART

An inkjet-type image forming apparatus detects a mal- ¹⁰ function nozzle that becomes unable to properly eject ink, among nozzles that eject ink in a recording head, and changes an ink ejection amount for an adjacent dot on the basis of an occurrence status of the malfunction nozzle (see PATENT LITERATURE #1, for example). ¹⁵

CITATION LIST

Patent Literature

PATENT LITERATURE #1: Japan Patent Application ²⁰
    Publication No. 2006-142807.

SUMMARY OF INVENTION

Technical Problem

When printing on a cut sheet, a nozzle used to depict each pixel in an image to be printed is differently determined sheet by sheet on the basis of a sheet transportation condition ³⁰ and correspondingly to a position (i.e. a position in a direction perpendicular to a transportation direction) of an incoming sheet in transportation. As mentioned, if the ink ejection amount is corrected due to the malfunction nozzle, then in a short time from determination of the sheet position ³⁵ to ink ejection, it is required to determine a pixel corresponding to the malfunction nozzle in the image to be printed and to perform a correction process for a periphery of the determined pixel, but if the correction process is performed by software the correction process is not finished ⁴⁰ in time.

Therefore, the correction process is performed by high-speed hardware, but if a large number of ink ejection malfunction positions must be memorized in a memory device, a large capacity of the memory device is required ⁴⁵ and thereby it results in a high cost of the apparatus.

The present invention has been conceived in view of the aforementioned problem, and it is an object of the present invention to obtain an image forming apparatus that effectively performs a correction process corresponding to ink ⁵⁰ ejection malfunction.

Solution to Problem

An image forming apparatus according to the present ⁵⁵ invention includes a recording head that ejects ink corresponding to an image to be printed, using arranged nozzles; a control unit that determines nozzles corresponding to the image to be printed, correspondingly to a position of a print sheet, and causes the recording head to eject ink from the ⁶⁰ nozzles; and a correction processing unit that performs a correction process corresponding to each of plural ink ejection malfunction positions in the image. Further, the correction processing unit (a) prints a test pattern using the recording head, (b) determines the ink ejection malfunction ⁶⁵ positions and ink ejection malfunction types on the basis of a scanned image of the test pattern, and (c) performs the correction process such that the ink ejection malfunction of which the ink ejection malfunction type is non ejection is preferentially performed than the ink ejection malfunction of which the ink ejection malfunction type is ink ejection ⁵ deviation.

Advantageous Effect of Invention

By means of the present invention, obtained is an image forming apparatus that effectively performs a correction process corresponding to ink ejection malfunction.

These and other objects, features and advantages of the present invention will become more apparent upon reading of the following detailed description along with the accompanied drawings. ¹⁵

BRIEF DESCRIPTION OF DRAWINGS

FIG. 6 shows a diagram that explains a relationship among a detection result of an ink ejection malfunction position, an ink ejection malfunction type, and a correction process.

DESCRIPTION OF EMBODIMENTS

Hereinafter, an embodiment according to aspects of the present invention will be explained with reference to a ⁴⁵ drawing.

Figure 1:
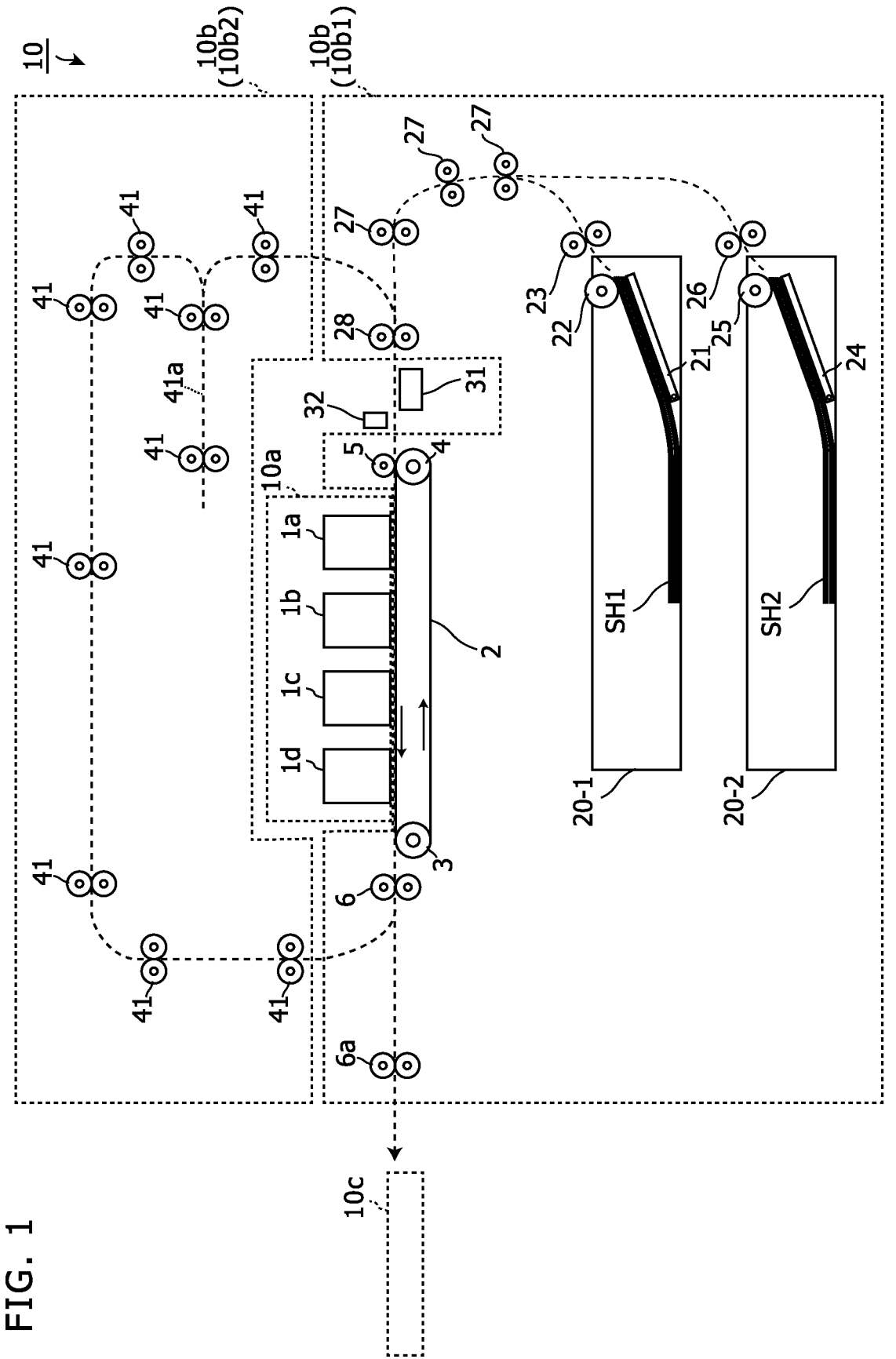
FIG. 1 shows a side view that indicates an internal ²⁰ mechanical configuration of an image forming apparatus in an embodiment according to the present invention.

FIG. 1 shows a side view that indicates an internal mechanical configuration of an image forming apparatus in an embodiment according to the present invention. The image forming apparatus 10 in this embodiment is an ⁵⁰ apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on ⁵⁵ a print sheet (print paper sheet or the like). In this embodiment, the print engine 10*a* is a line-type inkjet print engine.

In this embodiment, the print engine 10*a* includes line-type recording heads 1*a* to 1*d* corresponding to four ink colors: Cyan, Magenta, Yellow, and Black.

Figure 2:
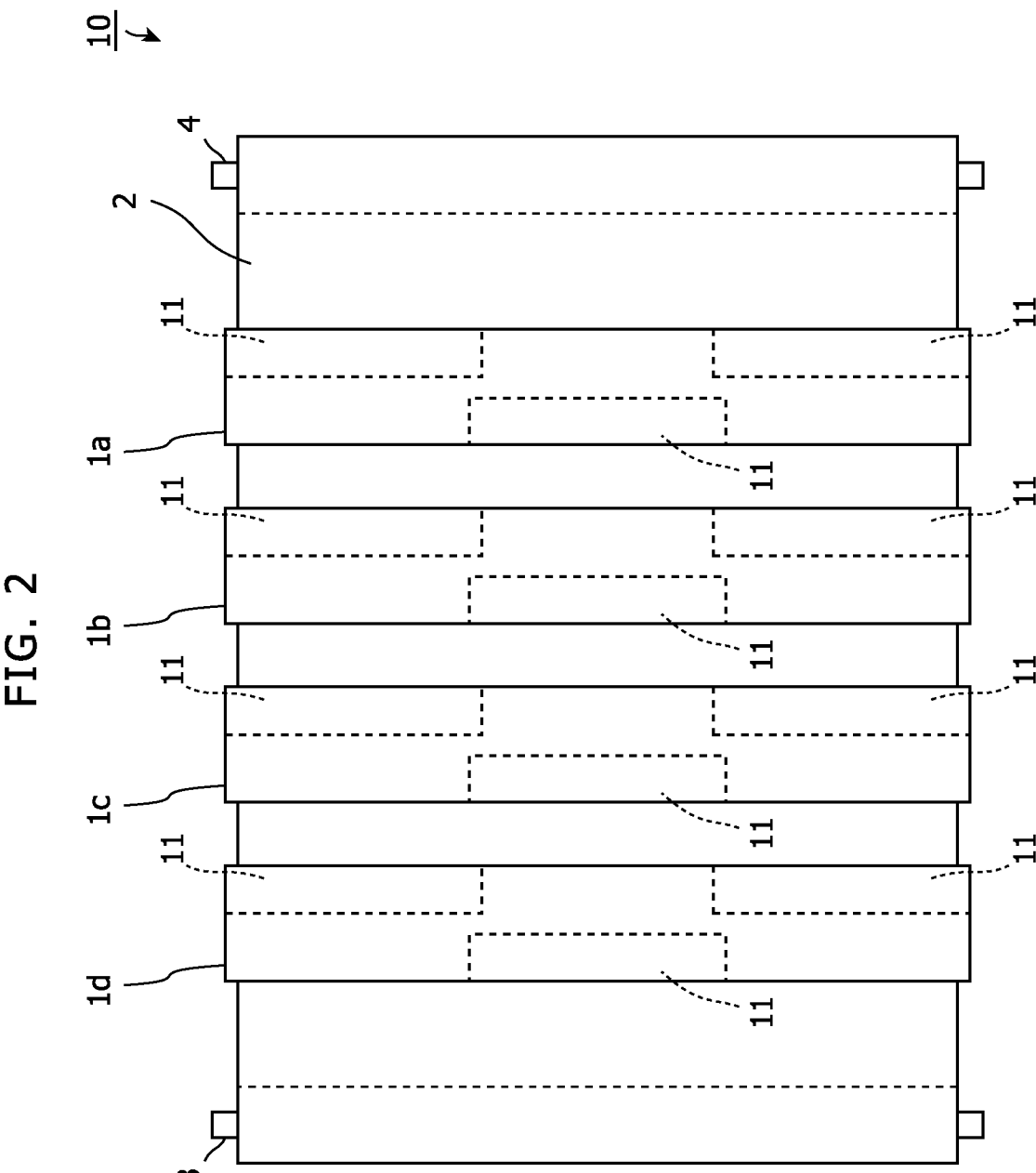
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 ⁶⁵ are arranged along a primary scanning direction, and are capable of being mounted to and demounted from a main body of the image forming apparatus. Each of the inkjet recording units 1a, 1b, 1c and 1d may include only one head unit 11. The head unit 11 of the inkjet recording unit 1a, 1b, 1c or 1d includes 2-dimensionally arranged nozzles, and ejects ink corresponding to the image to be printed using the nozzles.

The sheet transportation unit 10b transports the print sheet to the print engine 10a along a predetermined transportation path, and transports the print sheet after printing from the print engine 10a to a predetermined output destination (here, an output tray 10c or the like).

The sheet transportation unit 10b includes a main sheet transportation unit 10b1 and a circulation sheet transportation unit 10b2. In duplex printing, the main sheet transportation unit 10b1 transports to the print engine 10a a print sheet to be used for printing of a first-surface page image, and the circulation sheet transportation unit 10b2 transports the print sheet from a posterior stage of the print engine 10a to a prior stage of the print engine 10a with detaining a predetermined number of print sheets.

In this embodiment, the main sheet transportation unit 10b1 includes (a) a circular-type transportation belt 2 that is arranged so as to be opposite to the print engine 10a and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6a.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet is outputted by the output roller pairs 6 and 6a to an output tray 10c or the like.

Further, the main sheet transportation unit 10b1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10b2 returns the print sheet from a predetermined position in a downstream side of the print engine 10a to a predetermined position in an upstream side of the print engine 10a (here, to a predetermined position in an upstream side of a line sensor 31 mentioned below). The circulation sheet transportation unit 10b2 includes a transportation roller 41, and a switch back transportation path 41a that reverses a movement direction of the print sheet in order to change a surface that should face the print engine 10a among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine 10a.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine 10a is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10b2 transports the print sheet from the downstream side of the print engine 10a to the upstream side of the line sensor 31 with changing an orientation of the print sheet in a switch back manner.

Figure 3:
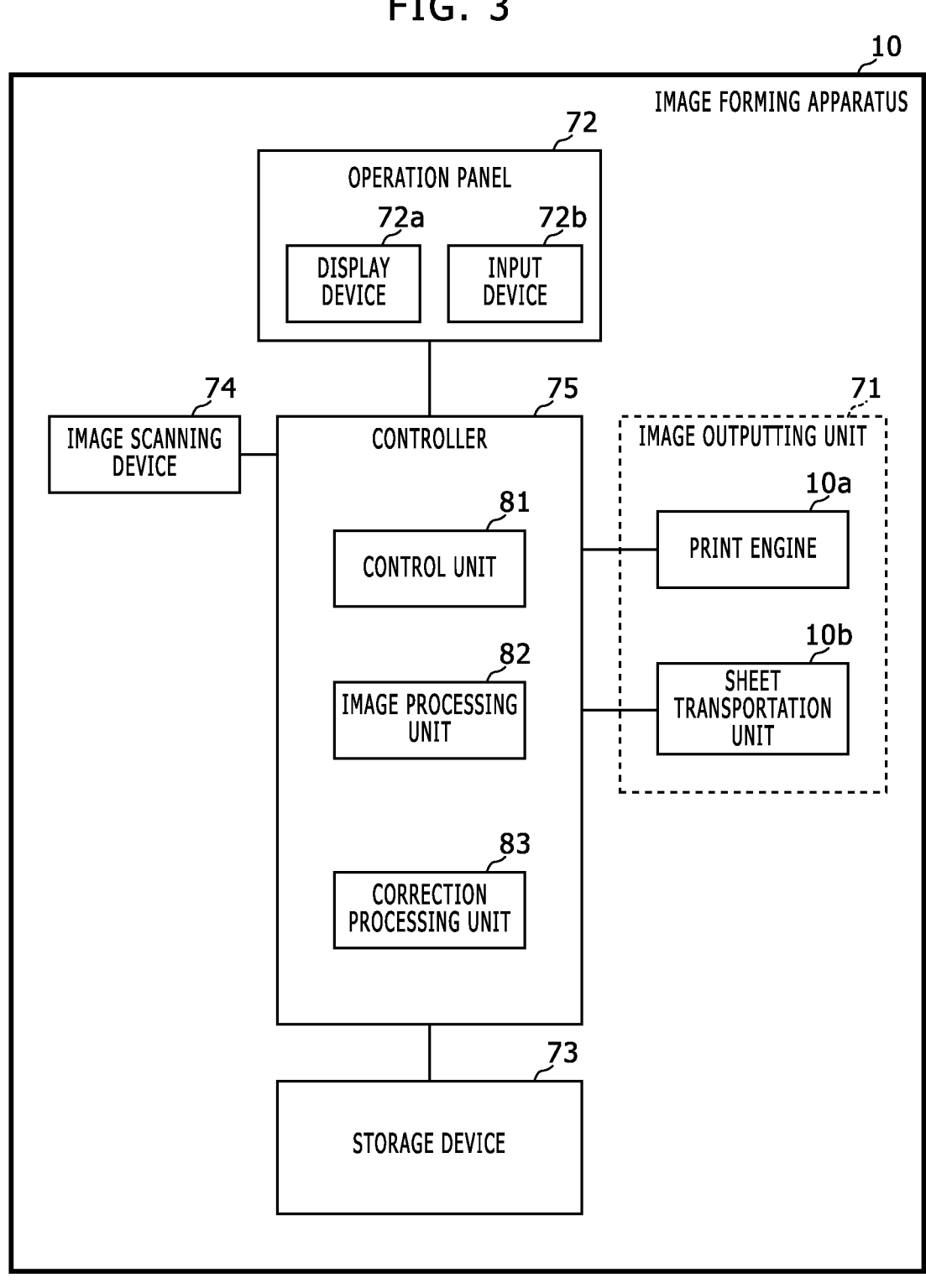
FIG. 3 shows a block diagram that indicates an electronic ²⁵ configuration of the image forming apparatus 10 in the embodiment according to the present invention.

FIG. 3 shows a block diagram that indicates an electronic configuration of the image forming apparatus 10 in the embodiment according to the present invention. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72a such as a liquid crystal display and an input device 72b such as a hard key and/or a touch panel, and displays sorts of messages for a user using the display device 72a and receives a user operation using the input device 72b.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, and a correction processing unit 83.

The control unit 81 controls the image outputting unit 71 (the print engine 10a, the sheet transportation unit 10b and the like), and thereby performs a print job requested by a user. In this embodiment, the control unit 81 causes the image processing unit 82 to perform a predetermined image process, and controls the print engine 10a (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10*a* to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10*a* and the actual sheet center position. In this embodiment, because the nozzles of the recording heads 1*a* to 1*d* do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1*a* to 1*d* to eject ink from the determined nozzles.

The correction processing unit 83 performs as a hardware process the correction process corresponding to each of the plural ink ejection malfunction positions in the image to be printed. In this correction process, for example, image data (a pixel value) of a pixel adjacent to the ink ejection malfunction position is corrected such that a density of this adjacent pixel gets higher.

Specifically, the correction processing unit 83 (a) prints a test pattern using the aforementioned recording head 1*a*, 1*b*, 1*c* or 1*d*, (b) determines the ink ejection malfunction positions and ink ejection malfunction types on the basis of a scanned image of the test pattern, and (c) performs the correction process such that the ink ejection malfunction of which the ink ejection malfunction type is non ejection is preferentially performed than the ink ejection malfunction of which the ink ejection malfunction type is ink ejection deviation. It should be noted that "ink ejection deviation" means a status that a primary-scanning-directional deviation appears on a hitting position of an ink droplet ejected from a nozzle.

In this embodiment, the correction processing unit 83 (a) using the recording head 1*a*, 1*b*, 1*c* or 1*d*, prints a first test pattern of a band shape that extends in a primary scanning direction (hereinafter, also called "horizontal-band test pattern") and a second test pattern of thin lines (straight thin lines along a secondary scanning direction) respectively corresponding to the nozzles (hereinafter, also called "vertical-line test pattern"), (b) determines the ink ejection malfunction positions on the basis of scanned images of the first and second test patterns, and (c) determines the ink ejection malfunction type as non ejection if the ink ejection malfunction position is determined in both of the scanned images of the first and second test patterns and determines the ink ejection malfunction type as ink ejection deviation if the ink ejection malfunction position is determined only in the scanned image of the first test pattern among the scanned images.

Figure 4:
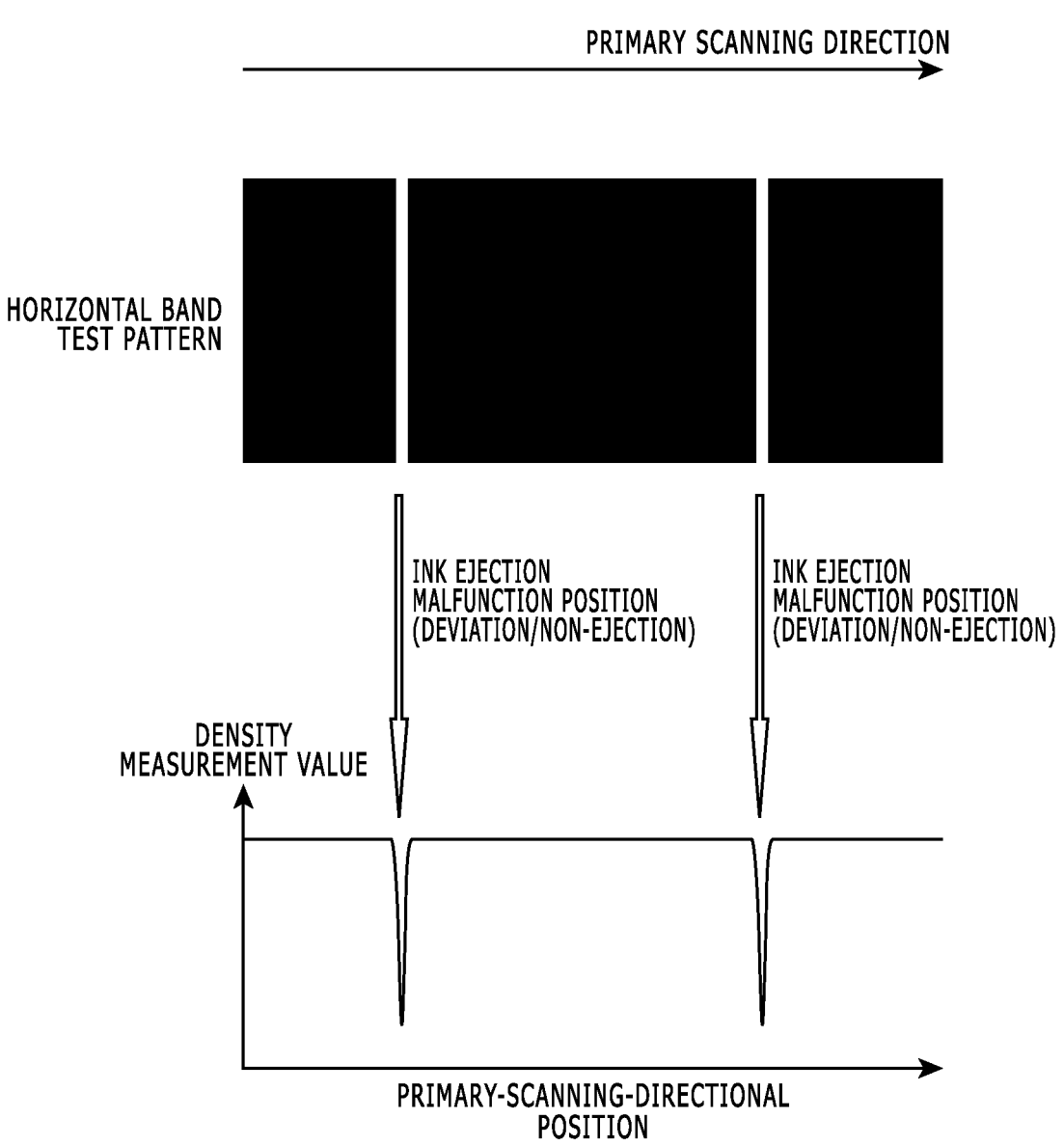
FIG. 4 shows a diagram that explains detection of an ink ejection malfunction position on the basis of a density distribution of a scanned image of a horizontal-band test ³⁰ pattern.
Figure 5:
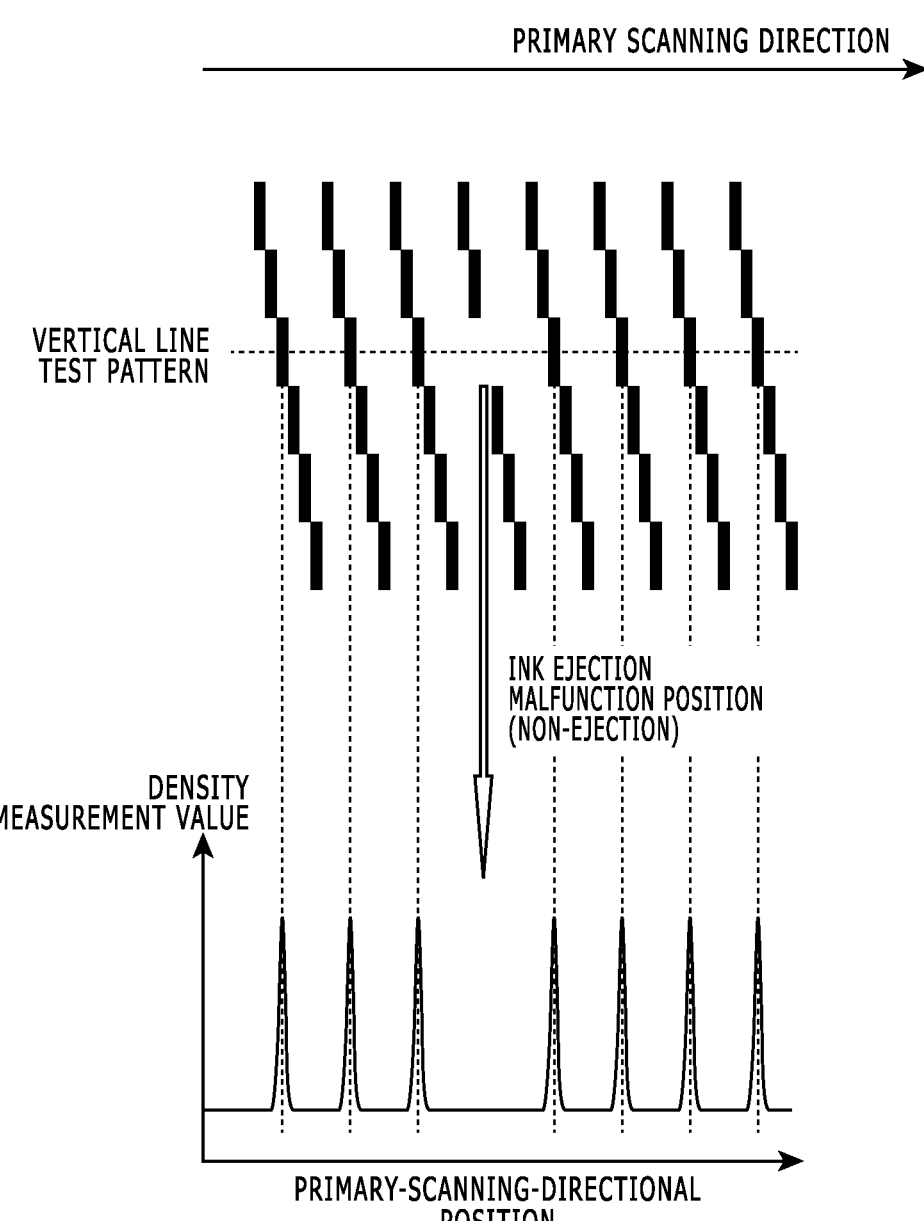
FIG. 5 shows a diagram that explains detection of an ink ejection malfunction position on the basis of a density distribution of a scanned image of a vertical-line test pattern; ³⁵

FIG. 4 shows a diagram that explains detection of an ink ejection malfunction position on the basis of a density distribution of a scanned image of a horizontal-band test pattern. FIG. 5 shows a diagram that explains detection of an ink ejection malfunction position on the basis of a density distribution of a scanned image of a vertical-line test pattern. It should be noted that an arrangement order of vertical lines in the vertical-line test pattern is not limited to that shown in FIG. 5. FIG. 6 shows a diagram that explains a relationship among a detection result of an ink ejection malfunction position, an ink ejection malfunction type, and a correction process.

In this embodiment, because the line sensor 31 is installed to detect a position of a print sheet, for example, the aforementioned test pattern is printed on the print sheet, the circulation transportation unit 10*b*2 transports the print sheet, the line sensor 31 scans an image of the printed test pattern, and the ink ejection malfunction position is detected on the basis of a primary-scanning-directional density distribution of this image.

For example, as shown in FIG. 4, in the scanned image of the horizontal-band test pattern, an appearance position of a dip in the density distribution is detected as the ink ejection malfunction position.

Further, as shown in FIG. 5, for example, in the scanned image of the vertical-line test pattern, detected as an ink ejection malfunction position is a position that a peak disappears in a density distribution of arrangement of the vertical lines.

Further, in this embodiment, as shown in FIG. 6, for example, if the number of the ink ejection malfunction positions determined only in the scanned image of the first test pattern among the scanned images is equal to or larger than a predetermined upperlimit number, then the correction processing unit 83 performs the correction process corresponding to the ink ejection malfunction positions of which the ink ejection malfunction type is non ejection, but does not perform the correction process corresponding to the ink ejection malfunction positions of which the ink ejection malfunction type is ink ejection deviation.

The scanned images of the aforementioned test patterns are obtained using the line sensor 31 or the image scanning device 74. If the line sensor 31 is used for the detection of the ink ejection malfunction positions as mentioned, the ink ejection malfunction positions are automatically detected, and the print sheet on which the test pattern has been printed is outputted. Instead of the line sensor 31, the print sheet on which the test pattern has been printed may be immediately outputted and set on the image scanning device 74 by a user, and the image on the print sheet may be scanned by the image scanning device 74.

The following part explains a behavior of the image forming apparatus 10.

(a) Determination of an Ink Ejection Malfunction Position that the Correction Process should be Performed The correction processing unit 83 causes the image outputting unit 71 to print the aforementioned horizontal-band and vertical-line test patterns on a print sheet.

The correction processing unit 83 acquires scanned images (i.e. image data of each ink color) of the horizontal-band test pattern and the vertical-line test pattern using the line sensor 31 or the image scanning device 74 as mentioned.

The correction processing unit 83 detects ink ejection malfunction positions and ink ejection malfunction type on the basis of a density distribution of the scanned images of the horizontal-band test pattern and the vertical-line test pattern in the primary scanning direction as mentioned, and determines nozzles corresponding to the ink ejection malfunction positions.

Subsequently, the correction processing unit 83 determines whether the number of the detected ink ejection malfunction positions (a total number of the number of nozzles of ink ejection deviation and the number of nozzles of non ejection) exceeds an upperlimit value (a limit number of the ink ejection malfunction positions for which the correction process is performed in the aforementioned short time) or not.

If the number of the detected ink ejection malfunction positions does not exceed the aforementioned upperlimit value, then the correction processing unit 83 determines as targets of the correction process the currently detected ink ejection malfunction positions, and stores data of the ink ejection malfunction positions and ink ejection malfunction nozzles into the storage device 73.

Otherwise, if the number of the detected ink ejection malfunction positions exceeds the aforementioned upperlimit value, then the correction processing unit 83 determines as targets of the correction process only ink ejection malfunction positions of non ejection among the currently detected ink ejection malfunction positions, excluding ink ejection malfunction positions of ink ejection deviation; and stores data of the ink ejection malfunction positions and ink ejection malfunction nozzles into the storage device 73.

As mentioned, nozzles (ink ejection malfunction positions) are set as targets of the correction process.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 83 reads the data of the ink ejection malfunction positions and the ink ejection malfunction nozzles from the storage device 73 and determines the ink ejection malfunction positions and the ink ejection malfunction nozzles before starting the printing; and upon detecting a position of a print sheet using the line sensor 31, the correction processing unit 83 (a) determines a nozzle corresponding to each pixel in the aforementioned image, (b) determines the ink ejection malfunction positions in the aforementioned image (i.e. corresponding nozzles), and (c) performs the correction process for the ink ejection malfunction positions. Subsequently, the control unit 81 performs the aforementioned printing on the basis of the image data after the correction process.

As mentioned, in Embodiment 1, the recording head 1a, 1b, 1c or 1d ejects ink corresponding to an image to be printed, using arranged nozzles. The control unit 81 determines nozzles corresponding to the image to be printed, correspondingly to a position of a print sheet, and causes the recording head 1a, 1b, 1c or 1d to eject ink from the nozzles. The correction processing unit 83 performs a correction process corresponding to each of the plural ink ejection malfunction positions in the aforementioned image.

Further, the correction processing unit 83 (a) prints a test pattern using the aforementioned recording head 1a, 1b, 1c or 1d, (b) determines the ink ejection malfunction positions and ink ejection malfunction types on the basis of a scanned image of the test pattern, and (c) performs the correction process such that the ink ejection malfunction of which the ink ejection malfunction type is non ejection is preferentially performed than the ink ejection malfunction of which the ink ejection malfunction type is ink ejection deviation.

Consequently, when many ink ejection positions appear, the correction process for minor ink ejection malfunction is curtailed, and thereby the correction can be totally performed with regard to a fatal blank line due to non ejection and customer complaint is reduced.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, regarding nozzles of ink ejection deviation, an ink ejection deviation amount (i.e. a deviation amount of a hitting position of an ink droplet) may be detected on the basis of the aforementioned scanned images (in particular, the scanned image of the vertical-line test pattern), the ink ejection malfunction type of the nozzles of ink ejection deviation may be classified into plural sub-types such as large deviation and small deviation on the basis of the ink ejection deviation amount, and if excluding only nozzles in the sub-type of small deviation among the nozzles of ink ejection deviation from the targets of the correction process makes the number of the targets of the correction process equal to or less than the aforementioned upperlimit value, then nozzles in the sub-type of large deviation other than those may not be excluded from the targets of the correction process.

INDUSTRIAL APPLICABILITY

For example, the present invention is applicable to an inkjet image forming apparatus.

The invention claimed is:

1. An image forming apparatus, comprising:

a recording head that ejects ink corresponding to an image to be printed, using arranged nozzles;

a control unit that determines nozzles corresponding to the image to be printed, correspondingly to a position of a print sheet, and causes the recording head to eject ink from the nozzles; and a correction processing unit that performs a correction process corresponding to each of plural ink ejection malfunction positions in the image;

wherein the correction processing unit (a) prints a test pattern using the recording head, (b) determines the ink ejection malfunction positions and ink ejection malfunction types on the basis of a scanned image of the test pattern, and (c) performs the correction process such that the ink ejection malfunction of which the ink ejection malfunction type is non ejection is preferentially performed than the ink ejection malfunction of which the ink ejection malfunction type is ink ejection deviation;

wherein the correction processing unit (a) using the recording head, prints a first test pattern of a band shape that extends in a primary scanning direction and a second test pattern of thin lines respectively corresponding to the nozzles, (b) determines the ink ejection malfunction positions on the basis of scanned images of the first and second test patterns, and (c) determines the ink ejection malfunction type as non ejection if the ink ejection malfunction position is determined in both of the scanned images of the first and second test patterns and determines the ink ejection malfunction type as ink ejection deviation if the ink ejection malfunction position is determined only in the scanned image of the first test pattern among the scanned images.

2. The image forming apparatus according claim 1, wherein the correction processing unit performs the correction process as a hardware process.

3. The image forming apparatus according claim 1, further comprising a line sensor that detects a position of the print sheet;

wherein the line sensor generates the scanned image of the test pattern.

4. An image forming apparatus, comprising:

a recording head that ejects ink corresponding to an image to be printed, using arranged nozzles;

a control unit that determines nozzles corresponding to the image to be printed, correspondingly to a position of a print sheet, and causes the recording head to eject ink from the nozzles; and a correction processing unit that performs a correction process corresponding to each of plural ink ejection malfunction positions in the image;

wherein the correction processing unit (a) prints a test pattern using the recording head, (b) determines the ink ejection malfunction positions and ink ejection malfunction types on the basis of a scanned image of the test pattern, and (c) performs the correction process such that the ink ejection malfunction of which the ink ejection malfunction type is non ejection is preferentially performed than the ink ejection malfunction of which the ink ejection malfunction type is ink ejection deviation;

wherein the correction processing unit using the recording head, prints a first test pattern of a band shape that extends in a primary scanning direction and a second test pattern of thin lines respectively corresponding to the nozzles and determines the ink ejection malfunction positions on the basis of scanned images of the first and second test patterns, wherein if the number of the ink ejection malfunction positions determined only in the scanned image of the first test pattern among the scanned images is equal to or larger than a predetermined upperlimit number, then the correction processing unit performs the correction process corresponding to the ink ejection malfunction positions of which the ink ejection malfunction type is non ejection, but does not perform the correction process corresponding to the ink ejection malfunction positions of which the ink ejection malfunction type is ink ejection deviation.

5. The image forming apparatus according claim 4, wherein the correction processing unit performs the correction process as a hardware process.

6. The image forming apparatus according claim 4, further comprising a line sensor that detects a position of the print sheet;

wherein the line sensor generates the scanned image of the test pattern.

* * * * *